(12) United States Patent
Meganathan et al.

(10) Patent No.: US 10,665,086 B1
(45) Date of Patent: May 26, 2020

(54) COGNITIVE VIRTUAL CENTRAL MONITORING STATION AND METHODS THEREFOR

(71) Applicant: Ademco Inc., Golden Valley, MN (US)

(72) Inventors: Deepak Sundar Meganathan, Bangalore (IN); Balamurugan Ganesan, Bangalore (IN); Shankar Prasad, Bangalore (IN)

(73) Assignee: ADEMCO INC., Golden Valley, MN (US)

( * ) Notice: Subject to any disclaimer, the term of this patent is extended or adjusted under 35 U.S.C. 154(b) by 0 days.

(21) Appl. No.: 16/275,619

(22) Filed: Feb. 14, 2019

(51) Int. Cl.
| | | |
|---|---|---|
| *H04M 11/04* | (2006.01) |
| *G08B 27/00* | (2006.01) |
| *G08B 25/01* | (2006.01) |
| *G10L 13/00* | (2006.01) |
| *G06N 3/02* | (2006.01) |

(52) U.S. Cl.
CPC ......... *G08B 27/001* (2013.01); *G08B 25/014* (2013.01); *G08B 25/016* (2013.01); *G10L 13/00* (2013.01); *G06N 3/02* (2013.01)

(58) Field of Classification Search
CPC .. G08B 27/001; G08B 25/014; G08B 25/016; G08B 13/196; G16H 40/20; G06Q 50/22; G06Q 20/1085; G06F 3/0481; G06F 3/0484; G06F 3/04817; G06F 3/04842; G06F 19/3418; H04N 7/188; H04N 7/18; H04N 7/181; H04L 29/08; Y04S 10/54; Y10S 128/92

USPC .............. 455/404.1; 348/152; 706/48
See application file for complete search history.

(56) References Cited

U.S. PATENT DOCUMENTS

| | | | |
|---|---|---|---|
| 4,821,027 A | 4/1989 | Mallory et al. | |
| 7,643,826 B2 * | 1/2010 | Brunet | G06Q 10/063 455/423 |
| 8,456,299 B2 | 6/2013 | Foisy et al. | |
| 9,536,049 B2 | 1/2017 | Brown et al. | |
| 9,747,896 B2 * | 8/2017 | Kennewick, Jr. | G06F 17/28 |
| 2006/0074708 A1 * | 4/2006 | Woods | G06Q 50/22 705/2 |
| 2007/0204007 A1 * | 8/2007 | Ashaari | H04L 41/0681 709/217 |
| 2008/0004499 A1 * | 1/2008 | Davis | G06F 19/3418 600/300 |
| 2012/0157037 A1 * | 6/2012 | Hoffman | G08B 25/08 455/404.2 |
| 2015/0294671 A1 * | 10/2015 | Oh | G08B 25/14 704/235 |
| 2015/0296188 A1 * | 10/2015 | Meganathan | H04N 7/181 348/143 |
| 2015/0339570 A1 * | 11/2015 | Scheffler | G06N 3/04 706/16 |

(Continued)

*Primary Examiner* — Mahendra R Patel
(74) *Attorney, Agent, or Firm* — Husch Blackwell LLP

(57) ABSTRACT

Systems and methods for a cognitive virtual central monitoring station (CMS) and methods therefor are provided. Some methods can include the cognitive virtual CMS receiving historical data representing interactions between CMS human operators and first security systems, the cognitive virtual CMS analyzing the historical data to generate algorithms and rules for the cognitive virtual CMS, the cognitive virtual CMS interacting with a second security system, and the cognitive virtual CMS using the algorithms and the rules to respond to the second security system.

17 Claims, 5 Drawing Sheets

Solution diagram

(56) References Cited

U.S. PATENT DOCUMENTS

2019/0139383 A1\* 5/2019 Folsom ................ G08B 27/005

\* cited by examiner

COGNITIVE VIRTUAL CENTRAL MONITORING STATION AND METHODS THEREFOR

FIELD

The present invention relates generally to security systems. More particularly, the present invention relates to a central monitoring station powered by artificial intelligence.

BACKGROUND

Security systems are known to detect threats within a secured area, and such threats can include events that represent a risk to human safety or a risk to assets.

Security systems typically include one or more security sensors that detect the threats within the secured area. For example, smoke, motion, contact, camera, gas, and/or intrusion sensors can be distributed throughout the secured area in order to detect the threats.

Known security systems send an alarm message to a central monitoring station upon activation of one of the security sensors, and human operators at the central monitoring station reviewing the alarm message respond by summoning appropriate help. For example, if the one of the security sensors detects a fire, then the human operators at the central monitoring station can summon a local fire department. Alternatively, if the one of the security sensors detects an intrusion, then the human operators at the central monitoring station can summon the police.

Known central monitoring stations are conventionally operated exclusively by the human operators. That is, when the central monitoring station receives the alarm message, one of the human operators responds by manually summoning the appropriate help. As such, known central monitoring stations require a large staff of the human operators to effectively monitor all security systems connected thereto, which adds significant cost in terms of salary, benefits, etc. to employ the human operators. Therefore, there is a continuing and ongoing need to develop monitoring solutions at a lower cost.

DETAILED DESCRIPTION

Figure 1:
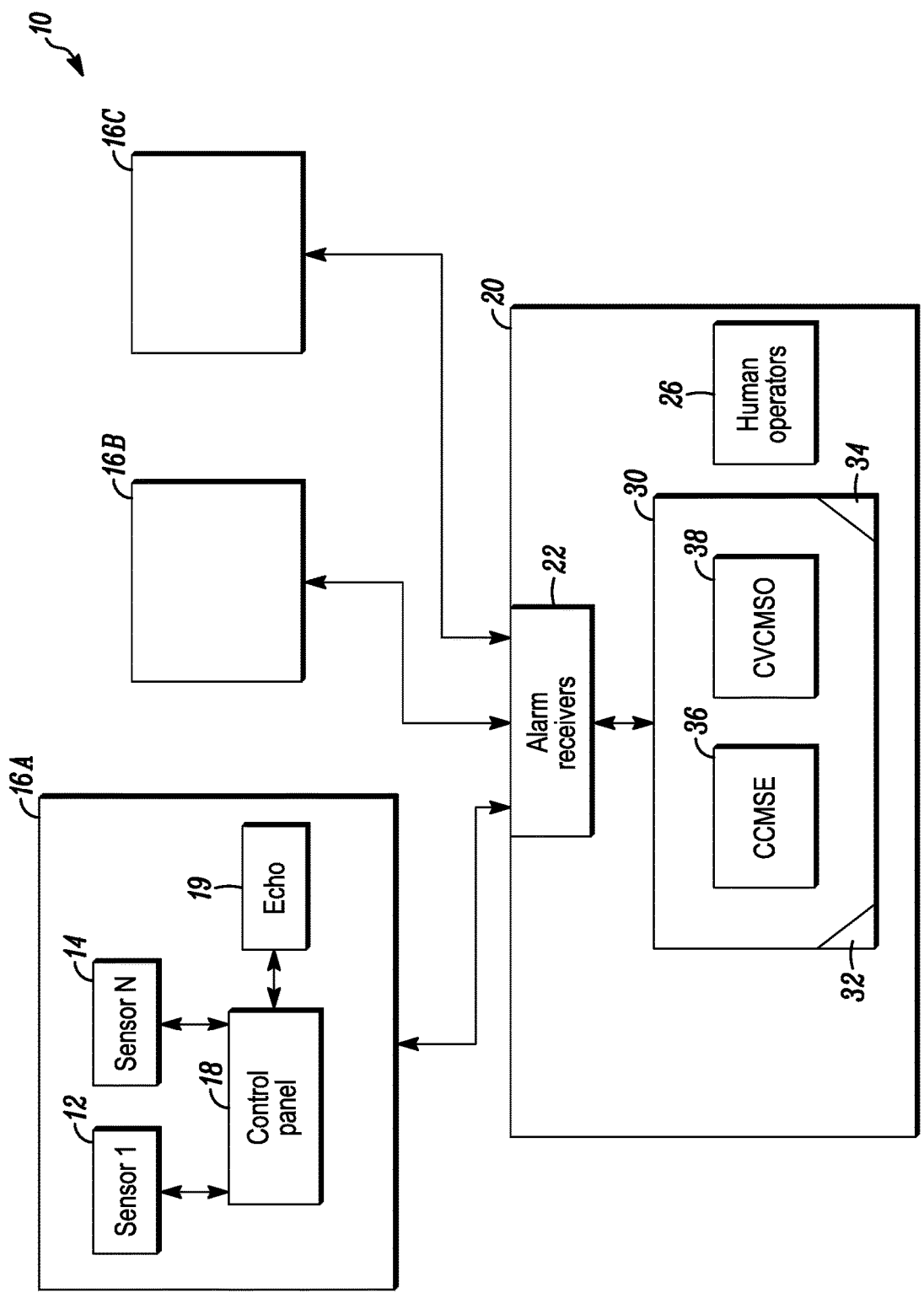
FIG. 1 is a block diagram of a system in accordance with disclosed embodiments.

While this invention is susceptible of an embodiment in many different forms, there are shown in the drawings and will be described herein in detail specific embodiments thereof with the understanding that the present disclosure is to be considered as an exemplification of the principles of the invention. It is not intended to limit the invention to the specific illustrated embodiments.

Embodiments disclosed herein can include systems and methods for powering a central monitoring station (CMS) with artificial intelligence (AI). According to exemplary embodiments, the CMS can be located in a facility remotely located from a secured area in which a security system monitored by the CMS is installed, and the CMS can monitor for alarm messages received from the security system that are indicative of alarm events. In some embodiments, the CMS can include one or more AI modules that can receive data, learn from the data, generate and modify algorithms based on such learning, and interact with customers and the security system based on the algorithms. According to exemplary embodiments, actions executed by the one or more AI modules can include, but are not limited to responding to the alarms messages, verifying the alarm messages (e.g. by calling a homeowner or using video analysis), assisting the customers in completing calls, answering repair service calls, dispatching appropriate local authorities (e.g. police for detected intrusions or a fire department for detected fires), troubleshooting security system issues, scheduling service calls by a technician, or assisting installers to verify that the CMS is receiving signals when the security system is newly installed.

In some embodiments, the one or more AI modules of the CMS can include a cognitive CMS engine (CCMSE) and a cognitive virtual CMS operator (CVCMSO). According to the exemplary embodiments, the CCMSE and the CVCMSO can execute the actions of the CMS that would otherwise be performed by human operators as well as other actions that could not previously be performed by such human operators.

According to exemplary embodiments, the CCMSE can include a neural network, machine learning, or another AI network or system. In some embodiments, the CCMSE can receive historical data stored in a situation database (i.e. before implementation of the AI), and the historical data can identify a plurality CMS events and how the human operators responded to each of the plurality of CMS events. For example, the historical data can indicate that the CMS received an alarm message related to a fire, that one of the human operators called the homeowner to confirm the fire responsive to the CMS receiving the alarm message, and that the human operator dispatched the fire department after confirming the fire with the homeowner. In some embodiments, the historical data can include system interaction data from a CMS tool (e.g. Honeywell's AlarmNet Direct) and voice call history data between customers (i.e. homeowners) and the human operators of the CMS. After receiving the historical data, the CCMSE can analyze the historical data to generate the algorithms using the machine learning or the neural network, and after integration, the CCMSE can continually learn from new data as the CCMSE executes the actions of the CMS (e.g. the new data is not included in the historical data) or when the human operators of the CMS override AI decisions. According to exemplary embodiments, the CCMSE can learn by updating the situation database when responding to the alarm messages and user queries and from real-time data.

According to exemplary embodiments, the CVCMSO can automate alarm verification and response. That is, the CVCMSO can receive the alarm message from the security system monitored by the CMS, verify that the alarm message indicates a real alarm event (e.g. an intrusion, a fire, a carbon monoxide leak, or other emergency), and dispatch appropriate emergency responders (e.g. police, fire department). In some embodiments, the CVCMSO can verify the alarm message by placing a call to the homeowner associated with the security system that transmitted the alarm message and interact with the homeowner using a neuro-linguistic programming (NLP) voice engine to verify the alarm message. For example, the NLP voice engine can ask the homeowner if he is at home and ask the homeowner if there is smoke in a room where smoke has been detected. The CVCMSO can receive verbal responses from the homeowner or responses transmitted via the homeowner pressing keypad numbers (e.g. 1=yes, 2=no). In some embodiments, the CVCMSO can receive video from a camera to verify the alarm message using video analytics. For example, the CVCMSO can verify the smoke in a video feed or verify that an unrecognized individual is present in a field of view of the camera.

In some embodiments, the CVCMSO can receive calls from the homeowners or the customers. When calling the CVCMSO, the homeowners can report an alarm situation, request a service call by a technician to fix a security system malfunction, or request assistance in troubleshooting a security system malfunction. The CVCMSO can respond to customer calls accordingly.

In some embodiments, the CVCMSO can receive calls from the installers of the security system. In such embodiments, the CVCMSO can be associated with two or more phone numbers, whereby a first of the phone numbers can be associated with use by the homeowners and the customers, and a second phone number can be associated with use by the installers. According to exemplary embodiments, the CVCMSO can interact with the installers to verify that, when newly installed, the security system is communicating with the CMS. For example, one of the installers can upload an identification number for the security system (e.g. a MAC address, IP address, or the like), and the CVCMSO can respond by verifying whether the CMS is receiving messages from the security system associated with the identification number uploaded.

In some embodiments, the CVCMSO can periodically request firmware versions of all security systems connected to the CMS to ensure that all of the security systems have updated firmware. If one of the security systems has out-of-date firmware, then the CVCMSO can initiate a firmware update for that one of the security systems. In some embodiments, the CVCMSO can verify one of the firmware versions of one of the security systems connected to the CMS by requesting an identification of an iteration of the firmware deployed in that security system (e.g. 2.0, 3.1, etc.) and a model number of a control panel for that security system. The CVCMSO can update a firmware database with the firmware versions of the security systems connected to the CMS whenever new firmware is released.

FIG. 1 is a block diagram of a security system 10 in accordance with disclosed embodiments. As seen in FIG. 1, the security system 10 can include one or more security sensors 12, 14 that monitor a first secured area 16A for threats, and in some embodiments, the security sensors 12, 14, can include contact, intrusion, camera, motion, fire, smoke, and/or gas detectors. The security sensors 12, 14 can communicate with a control panel 18, and the control panel 18 can monitor for activation of one or more of the security sensors 12, 14. In some embodiments, the secured area 16A can also include an internet-of-things (IoT) device 19, such as an Amazon Echo.

In some embodiments, the control panel 18 can send an alarm message to a CMS 20 upon the activation of one of the security sensors 12, 14, and the CMS 20 may respond by summoning appropriate help. For example, if the one of the security sensors 12, 14 detects a fire, then the CMS 20 may summon a local fire department. Alternatively, if the one of the security sensors 12, 14 detects an intrusion, then the CMS 20 may summon the police.

According to exemplary embodiments, the CMS 20 can include an alarm receiver 22 and control circuitry 30 and can be monitored by human operators 26. In some embodiments, the alarm receiver 22 can communicate with the first secured area 16A and a plurality of other secured areas 16B, 16C and can receive messages, including alarm messages, from the secured areas 16A, 16B, 16C. The plurality of other secured areas 16B, 16C can include structure and hardware similar to that of the first secured area 16A.

In any embodiment, the control circuitry 30 can include one or more programmable processors 32 and executable control software 34 as would be understood by one of ordinary skill in the art. The executable control software 34 can be stored on a transitory or non-transitory computer readable medium, including, but not limited to local computer memory, RAM, optical storage media, magnetic storage media, and the like. In some embodiments, the control circuitry 30, the programmable processors 32, and the executable control software 34 can execute and control all or some of the methods disclosed herein.

The control circuitry 30 can also include a CCMSE 36 and a CVCMSO 38. According to exemplary embodiments, the control circuitry 30, the programmable processors 32, and the executable control software 34 can generate and execute the CCMSE 36 and the CVCMSO 38. Furthermore, the control circuitry 30 can receive user input from the human operators 26.

Figure 2:
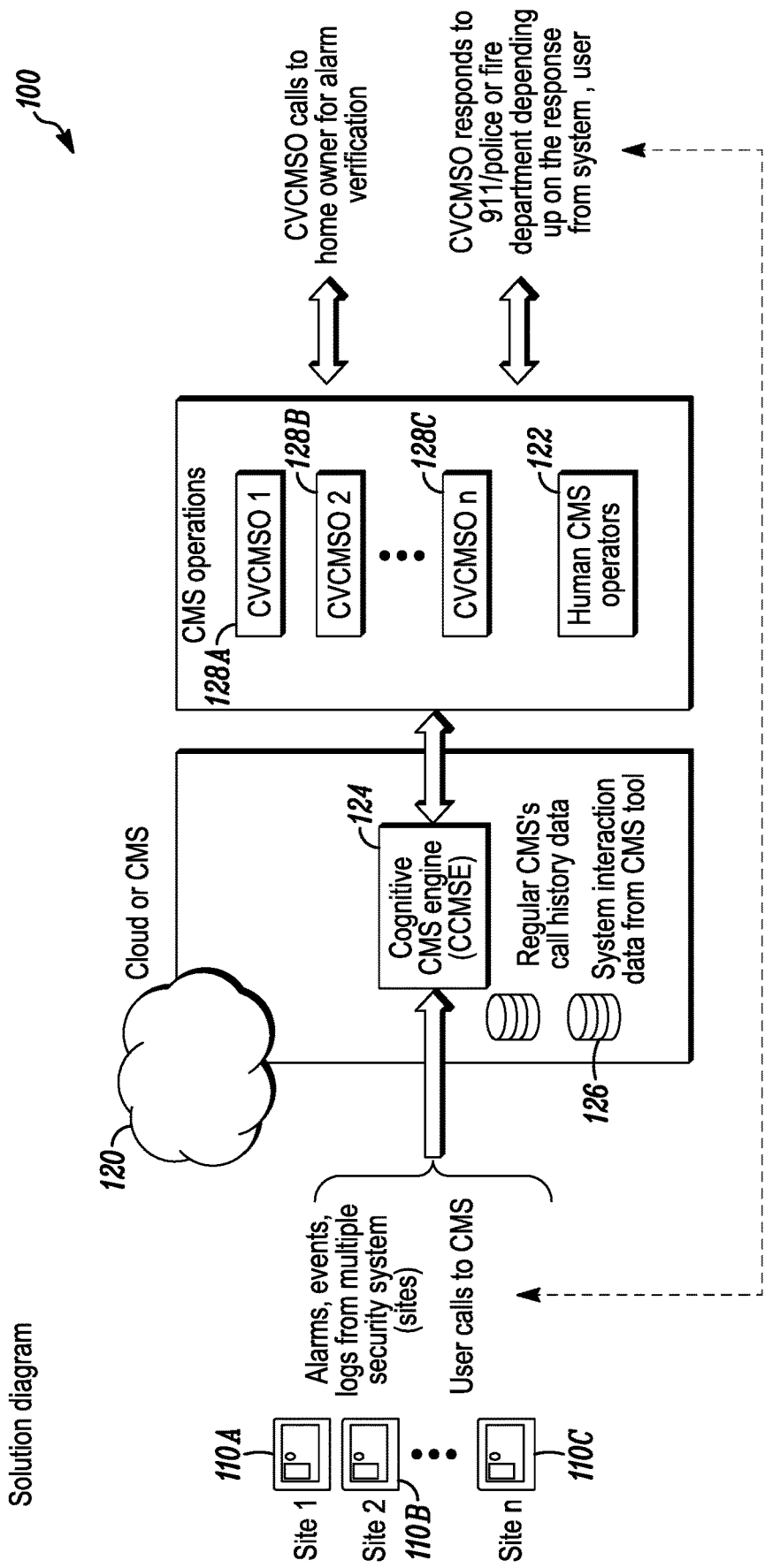
FIG. 2 is a block diagram of a central monitoring station in accordance with disclosed embodiments.

FIG. 2 is a block diagram of a system 100 in accordance with disclosed embodiments. The system 100 can be similar to or include the security system 10 of FIG. 1. In this regard, FIG. 2 can be viewed as illustrating additional details of the security system 10 of FIG. 1.

As seen in FIG. 2, the system 100 can include a plurality of secured areas 110A, 110B, 110C, and each of the secured areas 110A, 110B, 110C can include a respective control panel and a respective plurality of security sensors. The system 100 can also include a cloud server or device 120, which can be or can be included in a CMS. In some embodiments, the cloud server or device 120 can include a CCMSE 124, a database 126, and a plurality of CVCMSO's 128A, 128B, 128C and can be monitored by CMS human operators 122.

In some embodiments, the database 126 can store CMS call history data for calls answered by the human CMS operators 122 and for calls answered by the CVCMSO 128. Additionally, the database 126 can store system interaction data generated by the CMS human operators 122 when responding to emergencies or other CMS events. In some embodiments, the CCMSE 124 can create one or more of the plurality of CVCMSO's 128A, 128B, 128C that follow rules generated by the CCMSE 124. The CCMSE 124 can continue to generate new ones of the rules that evolve over time in response to new data generated by the plurality of CVCMSO's 128A, 128B, 128C based on interactions with homeowners or authorized users. The CCMSE 124 can store the rules in the database 126, and the plurality of CVCMSO's 128A, 128B, 128C can store the new data in the database 126.

In some embodiments, the cloud server or device 120 can generate one or more of the plurality of CVCMSO's 128A, 128B, 128C each time the CMS 120 receives a call or initiates a call to one of the homeowners or the authorized users of one of the secured areas 110A, 110B, 110C.

In some embodiments, the secured areas 110A, 110B, 110C can report alarms, events, and logs to the cloud server or device 120, and the CCMSE 124 can analyze and ingest such data received from the secured areas 110A, 110B, 110C to update algorithms and the rules for the plurality of CVCMSO's 128A, 128B, 128C. The cloud server or device 120 can also receive phone calls from the homeowners or the authorized users of the secured areas 110A, 110B, 110C and can relay such phone calls to one or more of the plurality of CVCMSO's 128A, 128B, 128C.

In some embodiments, the plurality of CVCMSO's 128A, 128B, 128C can initiate calls to the homeowners or the authorized users of the secured areas 110A, 110B, 110C or to local authorities, such as local police or local fire departments. In some embodiments, the CMS human operators 122 can both oversee operations of the plurality of CVCMSO's 128A, 128B, 128C and respond to the phone calls received in a conventional manner.

In some embodiments, the plurality of CVCMSO's 128A, 128B, 128C can initiate a call to one of the homeowners or the authorized users in response to receiving an alarm message from a respective control panel at one of the secured areas 110A, 110B, 110C to confirm that the alarm message represents a real alarm event and is not a false alarm. In addition, the plurality of CVCMSO's 128A, 128B, 128C can receive a call from one of the homeowners or the authorized users for a variety of reasons, such as to identify an alarm event or to initiate a customer service request, such as paying a bill, requesting a change in service by the CMS, or requesting service from a technician. The plurality of CVCMSO's 128A, 128B, 128C can also receive a call from an installer to request confirmation that the CMS is communicating with a newly installed one of the secured areas 110A, 110B, 110C. In some embodiments, the plurality of CVCMSO's 128A, 128B, 128C can use an NLP voice engine to interact with the homeowners, the authorized users, or the installer via a wireless communication medium.

In some embodiments, the plurality of CVCMSO's 128A, 128B, 128C can communicate with the respective control panel at each of the secured areas 110A, 110B, 110C to confirm that a respective firmware version of the respective control panel is up-to-date. In some embodiments, upon detecting an out-of-date firmware version installed on a control panel, the plurality of CVCMSO's 128A, 128B, 128C can initiate a firmware upgrade for that control panel.

In some embodiments, the plurality of CVCMSO's 128A, 128B, 128C can request human assistance in making critical decisions, such as by requesting confirmation from one of the CMS human operators 122 before initiating a dispatch request to first responders or by requesting assistance in reviewing video associated with the alarm message.

In some embodiments, the plurality of CVCMSO's 128A, 128B, 128C can operate in a primary mode in which the plurality of CVCMSO's 128A, 128B, 128C execute all or substantially all actions of the CMS, such as receiving calls, placing calls, confirming alarm events, and dispatching local authorities. Alternatively, in some embodiments, the plurality of CVCMSO's 128A, 128B, 128C can operate in a secondary mode in which the plurality of CVCMSO's 128A, 128B, 128C only respond to calls when none of the CMS human operators 122 are available or when one of the CMS human operators 122 requests action from the plurality of CVCMSO's 128A, 128B, 128C.

Figure 3:
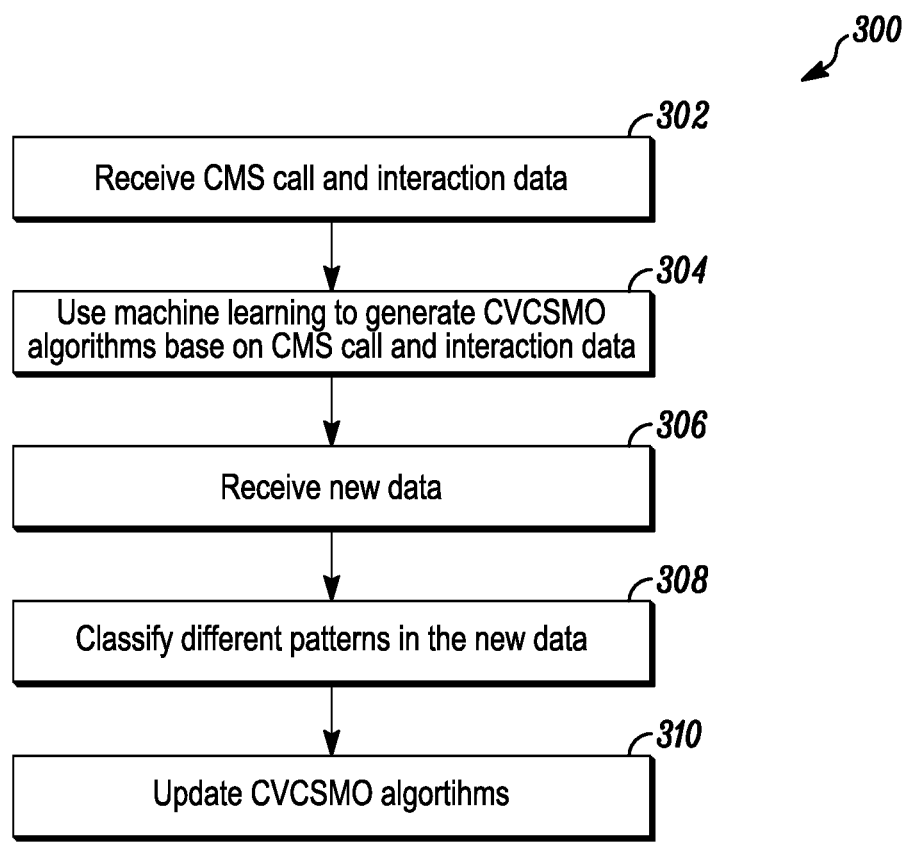
FIG. 3 is a flow diagram of a method in accordance with disclosed embodiments.

FIG. 3 is a flow diagram of a method 300 executed by a CCMSE (e.g. the CCMSE 26) in accordance with disclosed embodiments. As seen in FIG. 3, the method 300 can include a processor (e.g. a processor in the cloud server or device 120) receiving CMS call data and CMS interaction data as in 302 and the processor using machine learning to generate CVCMSO algorithms and rules based on the CMS call data and the CMS interaction data as in 304. In some embodiments, the CMS call data can include audio data of calls initiated or received by CMS human operators, and the CMS interaction data can include human decisions made by the CMS human operators in response to the calls. In some embodiments, the processor can include or use neural networks to understand and classify patterns that dictate the CVCMSO algorithms and rules.

Then, the method 300 can include the processor receiving new data as in 306, the processor determining whether the new data indicates new patterns as in 308, and the processor updating the CVCMSO algorithms and rules when the new data indicates new patterns as in 310. According to exemplary embodiments, the new data can include human overrides of CVCMSO decisions, new emergency events, and new audio data from phone calls initiated or received by a CVCMSO. For example, if the CVCMSO normally calls the police and the fire department in response to an intrusion event, but one of the CMS human operators overrides that decision to only dispatch the police, then the CCMSE can update the CVCMSO algorithms and rules to indicate that the CVCMSO should only dispatch the police in response to intrusions.

Figure 4:
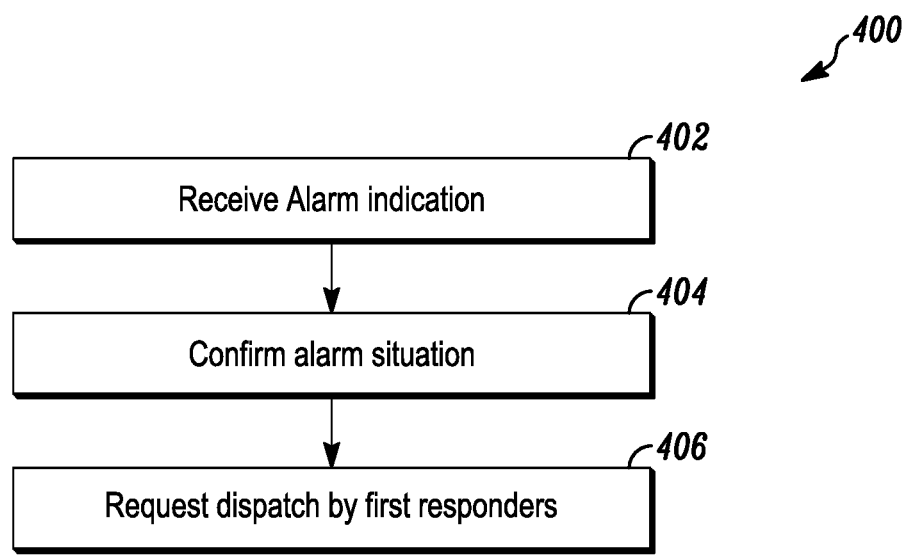
FIG. 4 is a flow diagram of a method in accordance with disclosed embodiments.

FIG. 4 is a flow diagram of a method 400 executed by a CVCMSO (e.g. the CVCMSO 38) in accordance with disclosed embodiments. As seen in FIG. 4, the method 400 can include a processor (e.g. a processor in the cloud server or device 120) receiving an alarm event as in 402. In some embodiments, the processor can receive the alarm event from a control panel (e.g. the control panel 18) in a secured area (e.g. the secured area 16A), and in some embodiments, the alarm event can include an alarm message received at a CMS (e.g. the CMS 20). Then, the method 400 can include the processor confirming the alarm event as a real alarm as in 404 and the processor transmitting an action message or initiating a call to dispatch first responders to the secured area as in 406. In some embodiments, the processor can confirm the alarm event by analyzing video captured in the secured area and received with the alarm message. Additionally or alternatively, in some embodiments, the processor can initiate a call to a homeowner or an authorized user of the secured area to confirm that the alarm event is a real alarm. In some embodiments, the processor can select an appropriate one of the first responders based on the alarm event (e.g. police for an intrusion, fire department for a fire, ambulance for a medical emergency) and can determine which one of the first responders can likely reach the secured area fastest based on a location of the secured area and an analysis of traffic data near the secured area.

Figure 5:
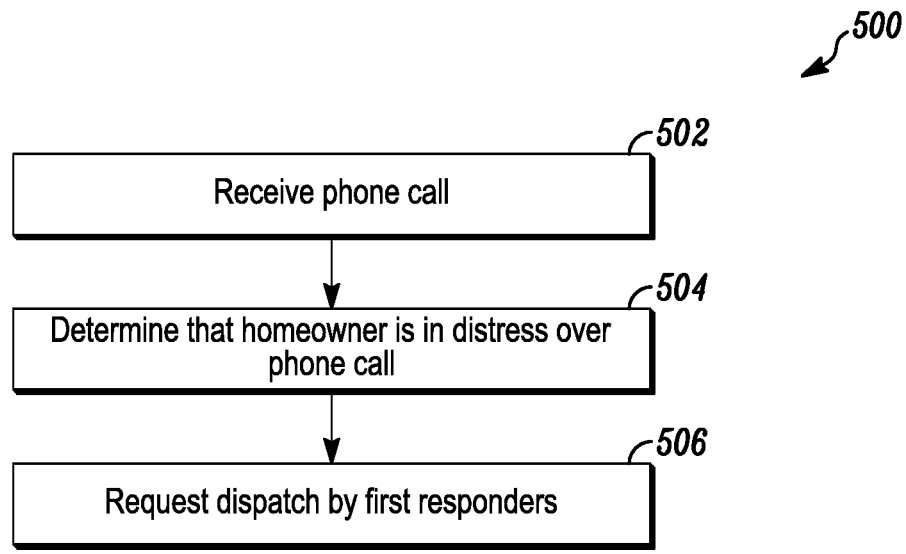
FIG. 5 is a flow diagram of a method in accordance with disclosed embodiments.

FIG. 5 is a flow diagram of a method 500 executed by a CVCMSO (e.g. the CVCMSO 38) in accordance with disclosed embodiments. As seen in FIG. 5, the method 500 can include a processor (e.g. a processor in the cloud server or device 120) receiving a phone call as in 502. In some embodiments, the processor can receive the phone call at a specialized phone number for emergencies or other customer service. Then, the method 500 can include the processor determining that a user associated with the phone call is in distress as in 504 and the processor sending an action message or initiating a call to dispatch first responders to a secured area associated with the user, the phone call, or a secured area associated with the user or from where the phone call originated as in 506. In some embodiments, the processor can determine that the user is in distress by analyzing audio data of the phone call to determine whether the audio data includes words like "emergency", "intruder", "gun", "knife", or "fire" or whether the audio data includes a predetermined distress code word uttered by the user.

Figure 6:
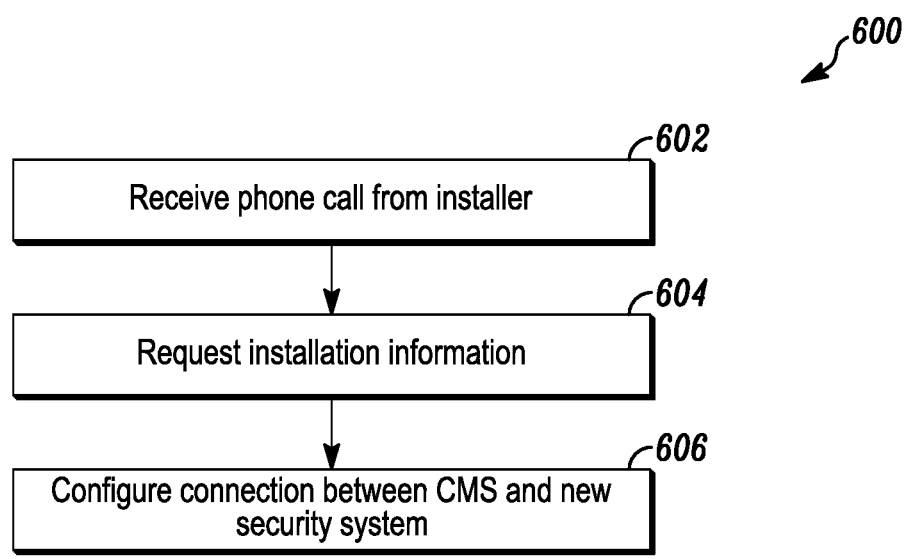
FIG. 6 is a flow diagram of a method in accordance with disclosed embodiments.

FIG. 6 is a flow diagram of a method 600 executed by a CVCMSO (e.g. the CVCMSO 38) in accordance with disclosed embodiments. As seen in FIG. 6, the method 600 can include a processor (e.g. a processor in the cloud server or device 120) receiving a phone call from an installer as in 602. In some embodiments, the processor can receive the phone call from the installer at a specialized phone number for installers. Then, the method 600 can include the processor determining that the installer wishes to set up a new security system as in 604 and the processor configuring a connection between a CMS associated with the processor and the new security system as in 606.

Figure 7:
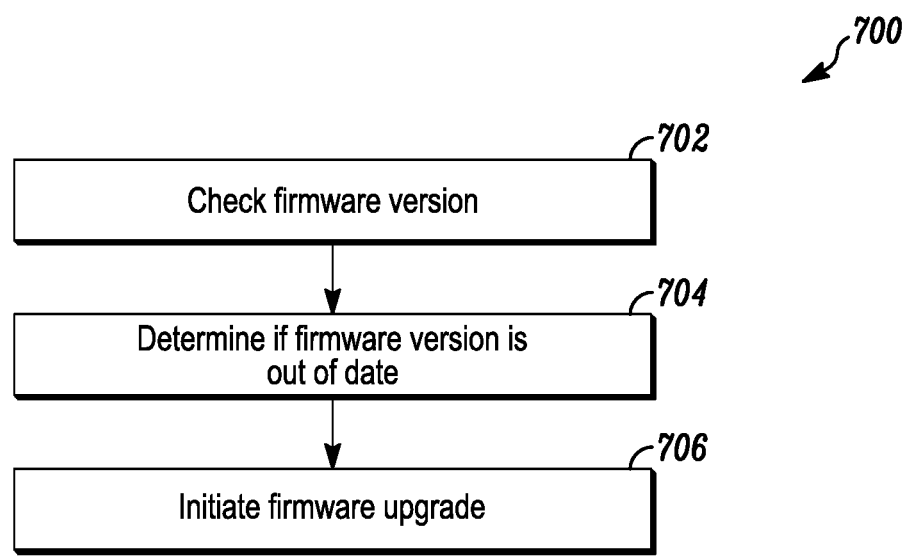
FIG. 7 is a flow diagram of a method in accordance with disclosed embodiments.

FIG. 7 is a flow diagram of a method 700 executed by a CVCMSO (e.g. the CVCMSO 38) in accordance with disclosed embodiments. As seen in FIG. 7, the method 700 can include a processor (e.g. a processor in the cloud server or device 120) identifying a firmware version for a control panel (e.g. the control panel 18) located in a secured area (e.g. the secured area 16A) as in 702. In some embodiments, the processor can request the firmware version for all control panels associated with a CMS associated with the processor or can individually request the firmware version for a single control panel. Then, the method 700 can include the processor determining whether the firmware version is up-to-date as in 704 and the processor initiating a firmware upgrade when the firmware version is out-of-date as in 706.

The exemplary embodiments described herein provide a significant improvement over the prior art. For example, alarm events can be confirmed faster than in the prior art and authorities can be dispatched quicker than in the prior art because artificial intelligence, rather than human operators, can be used to respond to the alarm events. Furthermore, the exemplary embodiments provide an improvement to the functionality of the cloud server or device 120 because the CCMSE 124 can identify patterns to make the CVCMSO 128 operate more efficiently than in the prior art when responding to calls and emergency events. That is, the CCMSE 124 can cause the CVCMSO 128 to operate faster, use fewer computer resources, and process emergency events more quickly than in the prior art due to constant analysis of new data generated by the CVCMSO 128 interacting with security system users.

Although a few embodiments have been described in detail above, other modifications are possible. For example, the logic flows described above do not require the particular order described or sequential order to achieve desirable results. Other steps may be provided, steps may be eliminated from the described flows, and other components may be added to or removed from the described systems. Other embodiments may be within the scope of the invention.

From the foregoing, it will be observed that numerous variations and modifications may be effected without departing from the spirit and scope of the invention. It is to be understood that no limitation with respect to the specific system or method described herein is intended or should be inferred. It is, of course, intended to cover all such modifications as fall within the spirit and scope of the invention.

What is claimed is:

1. A method comprising:
receiving historical data at a cognitive virtual central monitoring station (CMS), the historical data representing interactions between CMS human operators and first security systems in response to historical alarm events;
analyzing the historical data at the cognitive virtual CMS to identify actions performed by the CMS human operators in response to the historical alarm events, identify outcomes of the actions, and use the actions and the outcomes to generate algorithms and rules for the cognitive virtual CMS to use when responding to a current alarm event in lieu of the CMS human operators;
receiving an indication of the current alarm event from a second security system at the cognitive virtual CMS; and
using the algorithms and the rules at the cognitive virtual CMS operator to respond to the current alarm event.

2. The method of claim 1 wherein the cognitive virtual CMS uses a neuro-linguistic programming voice engine to transmit verbal messages to the second security system to respond to the current alarm event.

3. The method of claim 1 further comprising:
receiving an alarm message indicative of the current alarm event from the second security system.

4. The method of claim 3 further comprising:
soliciting confirmation of the current alarm event from the second security system.

5. The method of claim 4 further comprising:
dispatching first responders to a secured area associated with the second security system to respond to the current alarm event.

6. The method of claim 1 further comprising:
receiving a call indicative of the current alarm event from the second security system; and
determining whether a user associated with the call or the second security system is in distress.

7. The method of claim 1 further comprising:
determining that an installer of the second security system is configuring a connection between the cognitive virtual CMS and the second security system.

8. The method of claim 7 further comprising:
confirming that the cognitive virtual CMS is receiving messages from the second security system.

9. The method of claim 1 further comprising:
storing new data at the cognitive virtual CMS, the new data representing the interactions between the cognitive virtual CMS and the second security system in response to the current alarm event;
determining whether new patterns exist in the new data; and
updating the algorithms and the rules at the cognitive virtual CMS when the new patterns exist in the new data.

10. A system comprising:
a database for storing historical data representing interactions between central monitoring station (CMS) human operators and first security systems in response to historical alarm events;
a programmable processor; and
executable control software stored on a non-transitory computer readable medium,
wherein the programmable processor and the executable control software retrieve the historical data,
wherein the programmable processor and the executable control software analyze the historical data to identify actions performed by the CMS human operators in response to the historical alarm events, identify outcomes of the actions, and use the actions and the outcomes to generate algorithms and rules for the programmable processor and the executable control software to use when responding to a current alarm event in lieu of the CMS human operators, wherein the programmable processor and the executable control software receive an indication of the current alarm event from a second security system, and wherein the programmable processor and the executable control software use the algorithms and the rules to respond to the current alarm event.

11. The system of claim 10 wherein the programmable processor and the executable control software use a neuro-linguistic programming voice engine to transmit verbal messages to the second security system to respond to the current alarm event.

12. The system of claim 10 wherein the programmable processor and the executable control software receive an alarm message indicative of the current alarm event from the second security system.

13. The system of claim 12 wherein the programmable processor and the executable control software solicit confirmation of the current alarm event from the second security system.

14. The system of claim 13 wherein the programmable processor and the executable control software dispatch first responders to a secured area associated with the second security system to respond to the current alarm event.

15. The system of claim 10 wherein the programmable processor and the executable control software determine that an installer of the second security system is configuring a connection between the programmable processor and the second security system.

16. The system of claim 15 wherein the programmable processor and the executable control software confirm that the programmable processor is receiving messages from the second security system.

17. The system of claim 10 wherein the programmable processor and the executable control software store new data representing the interactions between the programmable processor, the executable control software, and the second security system in response to the current alarm event, wherein the programmable processor and the executable control software determine whether new patterns exist in the new data, and wherein the programmable processor and the executable control software update the algorithms and the rules when the new patterns exist in the new data.

* * * * *